`US010817562B2`

(12) United States Patent
Echols et al.

(10) Patent No.: US 10,817,562 B2
(45) Date of Patent: Oct. 27, 2020

(54) DISREGARDING AUDIO CONTENT

(71) Applicant: Lenovo (Singapore) Pte. Ltd., Singapore (SG)

(72) Inventors: Roderick Echols, Chapel Hill, NC (US); Ryan Charles Knudson, Durham, NC (US); Kushagra Jindal, Cary, NC (US); Timothy Winthrop Kingsbury, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 271 days.

(21) Appl. No.: 15/480,987

(22) Filed: Apr. 6, 2017

(65) Prior Publication Data

US 2018/0293309 A1    Oct. 11, 2018

(51) Int. Cl.
*G06F 7/00* (2006.01)
*G06F 16/683* (2019.01)
*G06F 16/638* (2019.01)

(52) U.S. Cl.
CPC .......... *G06F 16/683* (2019.01); *G06F 16/639* (2019.01); *G10H 2210/066* (2013.01); *G10H 2240/075* (2013.01)

(58) Field of Classification Search
CPC ......... G06F 17/30743; G06F 17/30772; G06F 16/683; G06F 16/639; G10H 2240/075; G10H 2210/066

USPC ........................... 707/722, 723, 999.01, 727
See application file for complete search history.

(56) References Cited

U.S. PATENT DOCUMENTS

| 2003/0177889 | A1* | 9/2003 | Koseki ................. | G10H 1/0058 84/609 |
|---|---|---|---|---|
| 2007/0052868 | A1* | 3/2007 | Chou ...................... | G06F 3/018 348/734 |
| 2014/0115465 | A1* | 4/2014 | Lee ....................... | G11B 27/031 715/716 |
| 2015/0120648 | A1* | 4/2015 | Slovacek ................ | G06F 16/41 707/609 |

* cited by examiner

*Primary Examiner* — Md I Uddin
(74) *Attorney, Agent, or Firm* — Ference & Associates LLC

(57) ABSTRACT

One embodiment provides a method, including: receiving, at an information handling device, a user input to play media files associated with a media file type from a playlist comprising a plurality of media files; analyzing, using a processor, the plurality of media files to identify at least one media file not associated with the media file type; disregarding, at least temporarily, based on the analyzing, the at least one media file; and providing, based on the disregarding, output of a media file from the playlist other than the at least temporarily disregarded at least one media file. Other aspects are described and claimed.

16 Claims, 3 Drawing Sheets

DISREGARDING AUDIO CONTENT

BACKGROUND

Information handling devices ("devices"), for example smart phones, tablet devices, laptop computers, smart speakers, and the like, are capable of accessing a media file playlist and providing audible output (e.g., through one or more speakers) associated with the media files (e.g., audio files, video files, etc.) in the playlist. A playlist may contain a variety of different media file types such as lyrical songs, instrumental songs, audiobooks, voice recordings, and the like. Responsive to a user command, a device may play the media files in the playlist in a particular order (e.g., sequential, random, etc.).

BRIEF SUMMARY

In summary, one aspect provides a method, comprising: receiving, at an information handling device, a user input to play media files associated with a media file type from a playlist comprising a plurality of media files; analyzing, using a processor, the plurality of media files to identify at least one media file not associated with the media file type; disregarding, at least temporarily, based on the analyzing, the at least one media file; and providing, based on the disregarding, output of a media file from the playlist other than the at least temporarily disregarded at least one media file.

Another aspect provides an information handling device, comprising: a processor; a memory device that stores instructions executable by the processor to: receive a user input to play media files associated with a media file type from a playlist comprising a plurality of media files; analyze the plurality of media files to identify at least one media file not associated with the media file type; disregard, at least temporarily, based on the instructions executable by the processor to analyze, the at least one media file; and provide, based on the instructions executable by the processor to disregard, output of a media file from the playlist other than the at least temporarily disregarded at least one media file.

A further aspect provides a product, comprising: a storage device that stores code, the code being executable by a processor and comprising: code that receives a user input to play media files associated with a media file type from a playlist comprising a plurality of media files; code that analyzes the plurality of media files to identify at least one media file not associated with the media file type; code that disregards, at least temporarily, based on the code that analyzes, the at least one media file; and code that provides, based on the code that disregards, output of a media file from the playlist other than the at least temporarily disregarded at least one media file.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
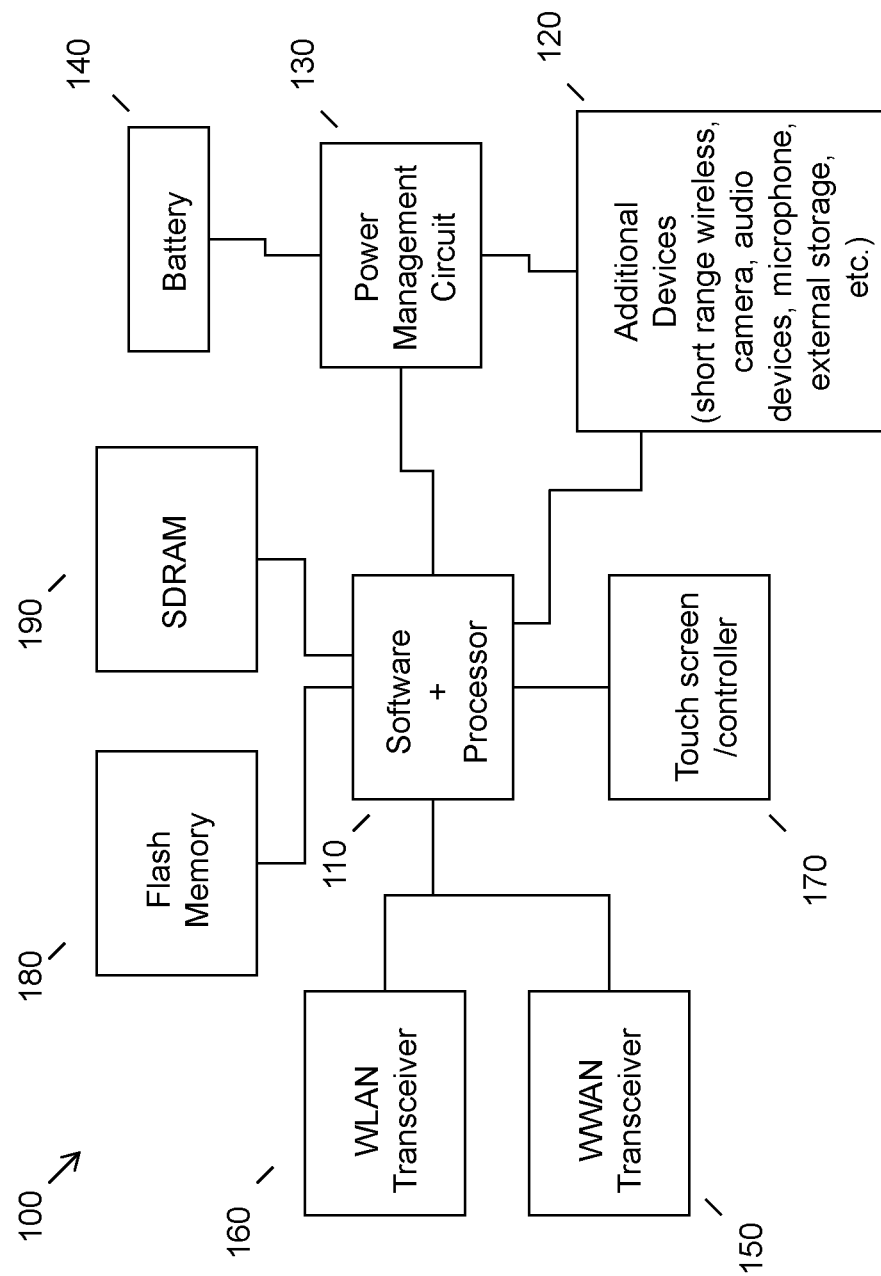
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Media file playlists ("playlists") contain a listing of audio and/or video files that may be played back on a media player associated with a device responsive to receiving user initiation input (e.g., touch input, stylus input, mouse input, voice input, etc.). These playlists are often chosen by users to accompany various activities such as parties, exercise sessions, long road trips, etc. Each playlist may be comprised of a variety of different media file types such as lyrical songs, instrumental songs, audiobooks, voice recordings, and the like. Conventionally, users may determine the order the media files in the playlist are played. For example, a user may request that the files are played sequentially (e.g., one after another as they occur in the playlist), alphabetically (e.g., by song title or artist name), randomly (e.g., by shuffling all of the media files in the playlist), or the like.

However, these conventional methods are unable to differentiate between different media file types. For example, for a playlist containing both lyrical songs and audio books, responsive to receiving a vocal user instruction to "randomly play all lyrical songs," a conventional system will be unable to differentiate between the songs and the audio books. Therefore, during random song selection, the system will randomly play any media file in the playlist, including the audiobooks or other media files that are not lyrical songs. This may present issues for users in that they then need to provide additional input to listen to a desired media file (e.g., user input to skip the undesired media file, making a playlist only including the desired songs, sorting the media files into different folders, etc.). Additionally, the playing of a media file associated with an undesired media file type may not coincide with a particular social setting or atmosphere a user intends to create, for example, a formal dinner party where the user only intends to play instrumental music may be interrupted by a media file associated with an undesired media file type, e.g., an audiobook, lyrical song, video, etc.

Existing solutions rely on metadata and file type designations to differentiate between media file types. However, many media files do not have metadata attached to them that identify the type of media file that they are. For example, certain media files uploaded by the user (e.g., self-recorded media files, audio books, etc.) or media files transferred from another user's playlist to the user's playlist may not have existing metadata attached that identifies the media file type for each media file. Furthermore, basing the differentiation off of existing file type designations also leads to erroneous results because oftentimes media files are designated with the incorrect media file type. For example, a lyrical song may be mistakenly classified as an instrumental song because, for example, the lyrical song does not have many lyrics. Additionally, some of the metadata may be uploaded by the user or other users and may incorrectly designate the media file type.

Accordingly, an embodiment provides a method for analyzing the media files in a playlist and disregarding the media files not associated with a desired media file type. In an embodiment, user input (e.g., voice input, touch input, etc.) associated with a media file type selection may be provided by a user to a device (e.g., smart phone, tablet, laptop computer, smart speaker, etc.). Subsequent to receiving the user input, an embodiment may analyze the plurality of media files to identify at least one media file not associated with the selected media file type. Subsequent to identifying the one or more media files not associated with the selected media file type, an embodiment may play and provide output for the remaining media files in the playlist while disregarding (e.g., disregarding completely, disregarding temporarily, etc.) and not playing the undesired media files. Such a method may eliminate occurrences of social setting disruption by the playing of media files associated with an undesired media file type and may also eliminate the need for users to provide additional input to skip the undesired media file.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
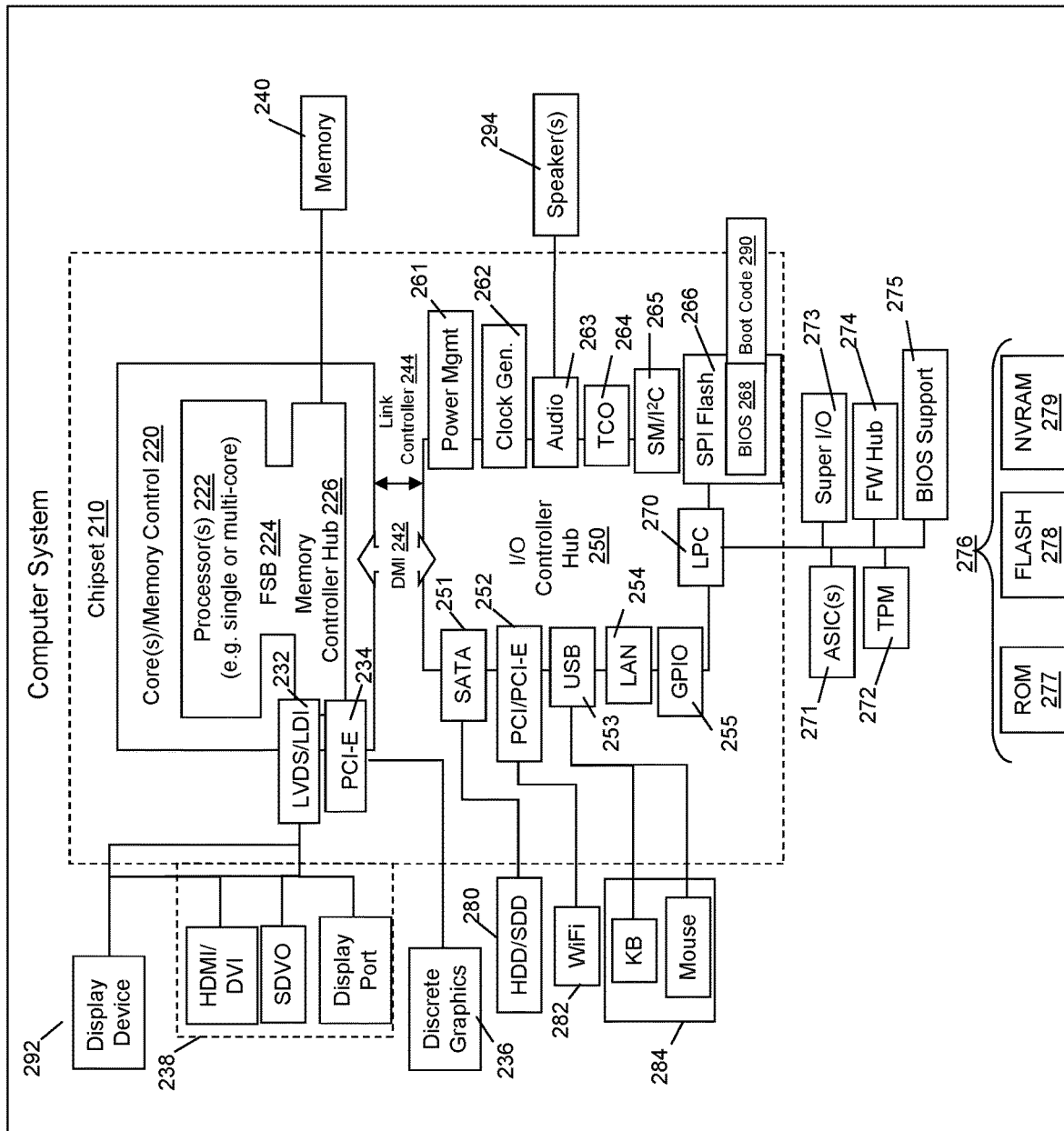
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices may be used by a user for playing media files, storing media files, and the like. For example, the circuitry outlined in FIG. 1 may be implemented in a tablet or smart phone embodiment, whereas the circuitry outlined in FIG. 2 may be implemented in a personal computer embodiment.

Figure 3:
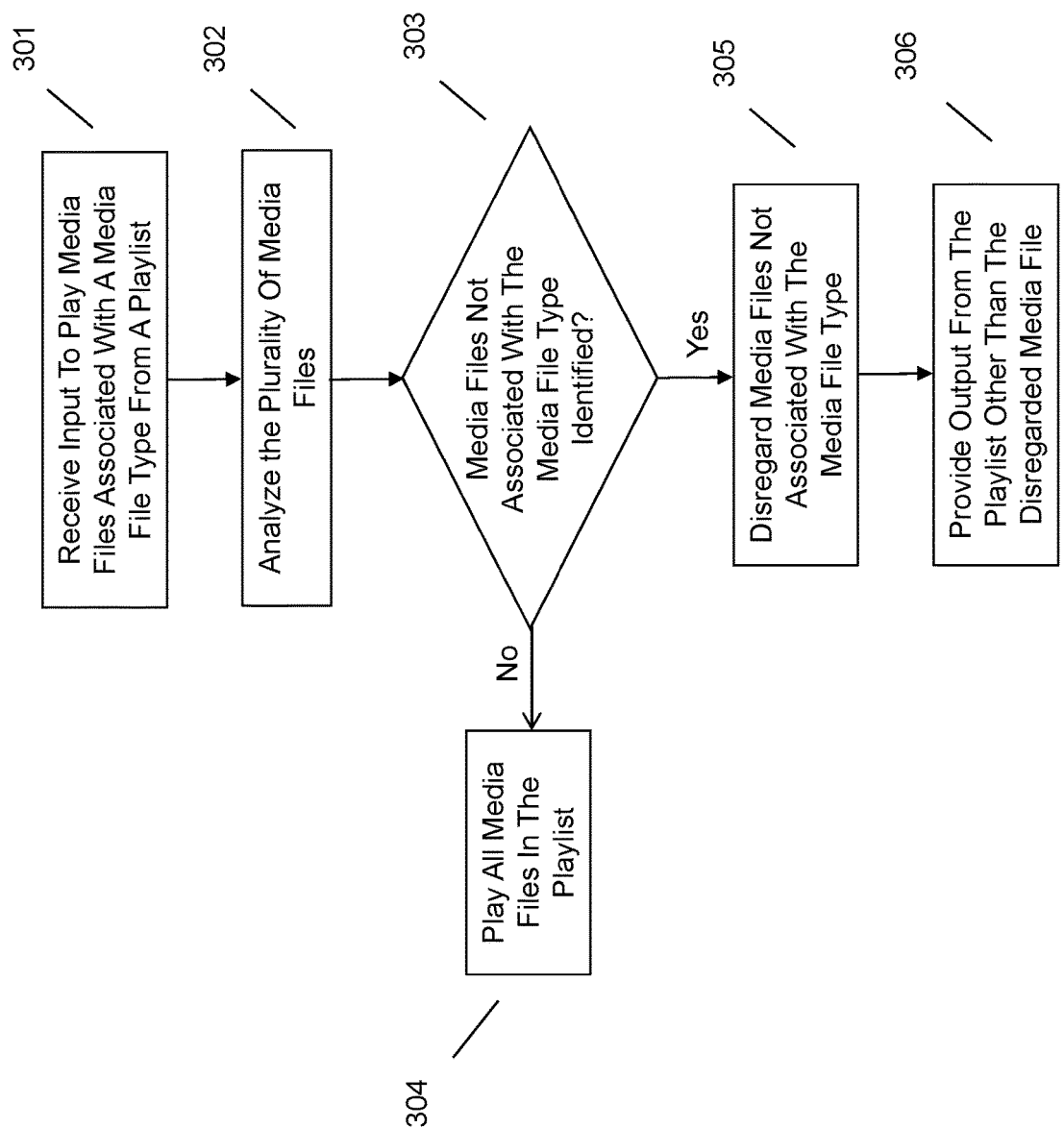
FIG. 3 illustrates an example method of identifying media files not associated with a specified media file type and only providing output of media files associated with the media file type.

Referring now to FIG. 3, an embodiment may identify any media file in a playlist not associated with a specified media file type and adjust the playlist to exclude the unassociated media files. The term "playlist" may refer to an actual playlist that the user has created with specific media files, or it may refer to a media file storage location. For example, the user may download all media files to a particular folder, or default location, and the folder or location may be considered the playlist. In other words, a playlist does not need to be a user-defined sorting or filtering of media files.

At 301, an embodiment may receive user input (e.g., voice input, touch input, stylus input, etc.) at an information handling device (e.g., a media plying device such as a smart phone, tablet device, laptop computer, smart speaker, etc.) to play all media files associated with a specific media file type (e.g., lyrical songs, instrumental songs, audiobooks, etc.) from a playlist. For example, a user may provide vocal input, "play all lyrical songs," to an input device (e.g., a microphone, speech capture device, etc.) operatively coupled to the media playing device. In an embodiment, the playlist may comprise media files associated with only a single media file type (e.g., lyrical songs) or may comprise media files from a mix of media file types (e.g., lyrical songs, instrumental songs, audiobooks, etc.). In an embodiment, the playlist can be stored locally (e.g., on the device), remotely (e.g., the cloud, network storage location, etc.), or a combination thereof.

At 302, an embodiment may analyze the plurality of media files to identify the media files not associated with the user-specified media file type. For example, responsive to receiving user input to "play all lyrical songs" an embodiment may analyze all the media files in the playlist to determine which media files are not lyrical songs. In an embodiment, the analysis may be conducted prior to receiving the user input. For example, the analysis may be conducted when a media file is added to the playlist, when the application comprising the playlist is initiated or activated, when the playlist is loaded, or at any other time before receiving user input to play a media file from the playlist. The analysis may also be conducted as the media files are being played. For example, the media files may be in a queue and the system may analyze the next or a subsequent media file in the queue before it is played, for example, while a prior media file is being played, while the media file is buffering, during selection of the media file, or the like.

Responsive to identifying, at 303, the media files in the playlist not associated with the user-specified media file type, an embodiment may disregard, at 305, the unassociated media files and provide, at 306, output of the other media files in the playlist that are associated with the desired media file type. In an embodiment, the disregarding of media files may be accomplished through one of a variety of ways. For example, the disregarded media files may be temporarily hidden so that the media files are not an option in the playlist queue. In another example, the disregarded media files may be tagged with metadata that tells the playlist to ignore, or skip, the media files when they appear in the playlist queue. In yet a further example, the disregarded media files may be temporarily disregarded (e.g., moved to the bottom of the playlist queue, etc.) and only played after all of the media files associated with the media file type have been played. Responsive to identifying, at 303, that all of the media files in the playlist are of the same media file type as the user-specified media file type, an embodiment may provide, at 304, output for all of the media files in the playlist. In an embodiment, the output for the media files may be provided, for example, by one or more speakers, audio output devices, etc.

Referring back to 302, a variety of analysis methods may be used to identify which media files are not associated with the user-specified or desired media file type. One analysis method may include analyzing the media file(s) to determine the presence of a set of predefined musical tones. For example, certain types of media files may include different or particular musical tones, notes, or frequencies. In an embodiment, musical tones may be selected that are present in a musical scale, e.g., C, E, GC etc. Lyrical songs and instrumental songs are likely to contain these musical tones whereas audiobooks and voice recordings are not. In an embodiment, the user may specify which musical tones are included in the set.

An embodiment may analyze the media files to determine whether or not they contain the predefined set of musical tones. Based on the media file type specified by the user, at 301, an embodiment may use the analysis to identify, at 303, the media files not associated with the specified media file type. For example, responsive to receiving user input to "play all songs," an embodiment may identify all media files that do not contain the predefined musical tones for disregarding. Conversely, the system may identify all the media files that do contain the predefined musical tones and only play those media files, thereby disregarding the other files. As another example, responsive to receiving user input to "play all voice-recordings," an embodiment may identify all media files that contain the predefined musical tones, or vice versa as discussed above. At 305, an embodiment may then disregard the media files including or missing the set of predefined musical tones (e.g., based on the specified media file type) and provide, at 306, audible output of the playlist other than the disregarded media files.

An embodiment may also analyze the media files for a reoccurrence of the musical tone set and make the identification based on whether or not the tone set appears in a media file more than a predetermined number of times. For example, if the musical tone set appears only once in a particular media file, an embodiment may identify that the media file is not a song. Such a situation may occur, for example, in a podcast where the vast majority of the podcast is speech but a small portion at the beginning of the podcast comprises music (e.g., an intro, commercial, sound effects, etc.).

Another analysis method may include analyzing the media file(s) to determine a frequency range of the media file(s). Music has a much broader frequency range than speech, therefore, an embodiment may compare the frequency data obtained from a sample of the media file to a predetermined frequency range (e.g., set by the user, provided as a default, based upon a rule set, etc.). In an embodiment, the sampling may be done once at a predetermined position in the media file for a predetermined duration (e.g., the middle of the duration of the media file, at the beginning at the media file, at a specified time of the media file, the entire media file, etc.), the sampling may be done at multiple predetermined intervals (e.g., every 2 seconds, 5 seconds, etc.), or the like. If the determined frequency range of the media file falls below the predetermined frequency range or corresponds to a particular frequency range, an embodiment may identify that the media file is a spoken media file (e.g., an audiobook, self-recorded speech, etc.). Conversely, if the determined frequency range of the media file is above the predetermined frequency range, an embodiment may identify that the media file is a musical media file (e.g., lyrical song, instrumental song, etc.). At 305, an embodiment may then disregard the media files above or below the predetermined frequency range (e.g., based on the specified media file type) and provide, at 306, audible output of the playlist other than the disregarded media files.

Another analysis method may include analyzing the media file(s) to determine a spectrogram for the media file. Music has a much smoother spectrogram than speech, therefore, an embodiment may compare the spectrogram obtained from a media file to a "control" spectrogram (e.g., having a predefined smoothness pattern). If the spectrogram of the media file is fuzzier than the control spectrogram, an embodiment may identify that the media file is a spoken media file (e.g., an audiobook, self-recorded speech, etc.). Conversely, if the spectrogram of the media file is as smoother or smoother than the control spectrogram, an embodiment may identify that the media file is a musical media file (e.g., lyrical song, instrumental song, etc.). At 305, an embodiment may then disregard the media files having spectrograms fuzzier or smoother than the control spectrogram (e.g., based on the specified media file type) and provide, at 306, audible output of the playlist other than the disregarded media files.

An embodiment may use spectrogram analysis to differentiate between lyrical media files and instrumental media files. Because lyrical media files, including lyrical song media files, comprise words the corresponding spectrogram (s) will likely be fuzzier than a spectrogram associated with an instrumental media file type, which will be much smoother. This embodiment enables users to provide more specific user commands. For example, a user may provide the vocal input "play all instrumental songs." Responsive to receiving this input, an embodiment may identify (e.g., by comparing the spectrograms for all of the media files in the playlist against a control spectrogram) all of the media files that are not associated with the instrumental media file type (e.g., lyrical songs, audio books, voice recordings, etc.).

The various embodiments described herein thus represent a technical improvement to conventional playlist playback functions. Using the techniques described herein, an embodiment may identify all media files in a playlist that are not associated with a user-specified media file type and subsequently provide output of the other media files in the playlist while disregarding the unassociated media files. Such techniques eliminate the need for users to provide additional input to skip an undesired media file. Additionally, these techniques prevent the interruption of a desired social setting or atmosphere caused by the playing of an undesired media file.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, one or more user inputs to play media files from a media file storage location, wherein the one or more user inputs identify a specific media file type to play from the media file storage location, wherein the media file storage location comprises a plurality of media files including at least one media file not associated with the specific media file type identified by the one or more user inputs;
analyzing, using a processor, the plurality of media files to identify the at least one media file not associated with the specific media file type and included within the plurality of media files, wherein the analyzing comprises analyzing each of the plurality of media files to determine a spectrogram for each of the plurality of media files, wherein the spectrogram associated with the media file type is smoother than a predetermined spectrogram and wherein the spectrogram associated with the at least one media file is fuzzier than the predetermined smoothness;
disregarding, at least temporarily, based on the analyzing and without receiving additional user input, the at least one media file not associated with the specific media file type, wherein the disregarding of the at least one media file comprises at least one of: temporarily hiding the at least one media file, tagging the at least one media file with metadata to be skipped, and temporarily disregarding the at least one media file, wherein temporarily hiding the at least one media file comprises removing the at least one media file from the media file storage location, and wherein temporarily disregarding the at least one media file comprises moving the at least one media file to a bottom of the media file storage location and playing the at least one media file after the plurality of media files associated the specific media file type are played; and
providing, after the disregarding, output of a media file having the specific media file type identified from the one or more user inputs from the media file storage location.

2. The method of claim 1, wherein the analyzing comprises analyzing each of the plurality of media files for predefined musical tones.

3. The method of claim 2, wherein the media file type contains the predefined musical tones and wherein the at least one media file does not contain the predefined musical tones.

4. The method of claim 2, wherein the media file type does not contain the predefined musical tones and wherein the at least one media file contains the predefined musical tones.

5. The method of claim 1, wherein the analyzing comprises analyzing each of the plurality of media files to determine a frequency range for each of the plurality of media files.

6. The method of claim 5, wherein the frequency range associated with the media file type is higher than a predetermined frequency range and wherein the frequency range associated with the at least one media file is lower than the predetermined frequency range.

7. The method of claim 5, wherein the frequency range associated with the media file type is lower than a predetermined frequency range and wherein the frequency range associated with the at least one media file is higher than the predetermined frequency range.

8. The method of claim 1, wherein the spectrogram associated with the media file type is fuzzier than a predetermined spectrogram and wherein the spectrogram associated with the at least one media file is smoother than the predetermined smoothness.

9. An information handling device, comprising:
a processor;
a memory device that stores instructions executable by the processor to:
receive one or more user inputs to play media files associated with a media file type from a media file storage location, wherein the one or more user inputs identify a specific media file type to play from the media file storage location, wherein the media file storage location comprises a plurality of media files including at least one media file not associated with the specific media file type identified by the one or more user inputs;
analyze the plurality of media files to identify at least one media file not associated with the specific media file type and included within the plurality of media files, wherein to analyze comprises instructions executable by the processor to analyze each of the plurality of media files to determine a spectrogram for each of the plurality of media files, wherein the spectrogram associated with the media file type is smoother than a predetermined spectrogram and wherein the spectrogram associated with the at least one media file is fuzzier than the predetermined smoothness;
disregard, at least temporarily, based on the instructions executable by the processor to analyze and without receiving additional user input, the at least one media file not associated with the specific media file type, wherein the disregarding of the at least one media file comprises at least one of: temporarily hiding the at least one media file, tagging the at least one media file with metadata to be skipped, and temporarily disregarding the at least one media file, wherein temporarily hiding the at least one media file comprises removing the at least one media file from the media file storage location, and wherein temporarily disregarding the at least one media file comprises moving the at least one media file to a bottom of the media file storage location and playing the at least one media file after the plurality of media files associated the specific media file type are played; and
provide, after the disregarding, output of a media file having the specific media file type identified from the one or more user inputs from the media file storage location.

10. The information handling device of claim 1, wherein the instructions executable by the processor to analyze comprise instructions executable by the processor to analyze each of the plurality of media files for predefined musical tones.

11. The information handling device of claim 10, wherein the media file type contains the predefined musical tones and wherein the at least one media file does not contain the predefined musical tones.

12. The information handling device of claim 10, wherein the media file type does not contain the predefined musical tones and wherein the at least one media file contains the predefined musical tones.

13. The information handling device of claim 9, wherein the instructions executable by the processor to analyze comprise instructions executable by the processor to analyze each of the plurality of media files to determine a frequency range for each of the plurality of media files.

14. The information handling device of claim 13, wherein the frequency range associated with the media file type is higher than a predetermined frequency range and wherein the frequency range associated with the at least one media file is lower than the predetermined frequency range.

15. The information handling device of claim 13, wherein the frequency range associated with the media file type is lower than a predetermined frequency range and wherein the frequency range associated with the at least one media file is higher than the predetermined frequency range.

16. A product, comprising:
a storage device that stores code, the code being executable by a processor and comprising:
code that receives one or more user inputs to play media files associated with a media file type from a media file storage location, wherein the one or more user inputs identify a specific media file type to play from the media file storage location, wherein the media file storage location comprises a plurality of media files including at least one media file not associated with the specific media file type identified by the one or more user inputs;
code that analyzes the plurality of media files to identify at least one media file not associated with the media file type, wherein the media file not associated with the media file type does not comprise the one or more user inputs received, wherein the analyzing comprises instructions executable by the processor to analyze each of the plurality of media files to determine a spectrogram for each of the plurality of media files, wherein the spectrogram associated with the media file type is smoother than a predetermined spectrogram and wherein the spectrogram associated with the at least one media file is fuzzier than the predetermined smoothness;
code that disregards, at least temporarily, based on the code that analyzes and without receiving additional user input, the at least one media file not associated with the specific media file type, wherein the disregarding of the at least one media file comprises at least one of: temporarily hiding the at least one media file, tagging the at least one media file with metadata to be skipped, and temporarily disregarding the at least one media file, wherein temporarily hiding the at least one media file comprises removing the at least one media file from the media file storage location, and wherein temporarily disregarding the at least one media file comprises moving the at least one media file to a bottom of the media file storage location and playing the at least one media file after the plurality of media files associated the specific media file type are played; and
code that provides, after the disregarding, output of a media file having the specific media file type identified from the one or more user inputs from the media file storage location.

* * * * *